UNITED STATES PATENT OFFICE.

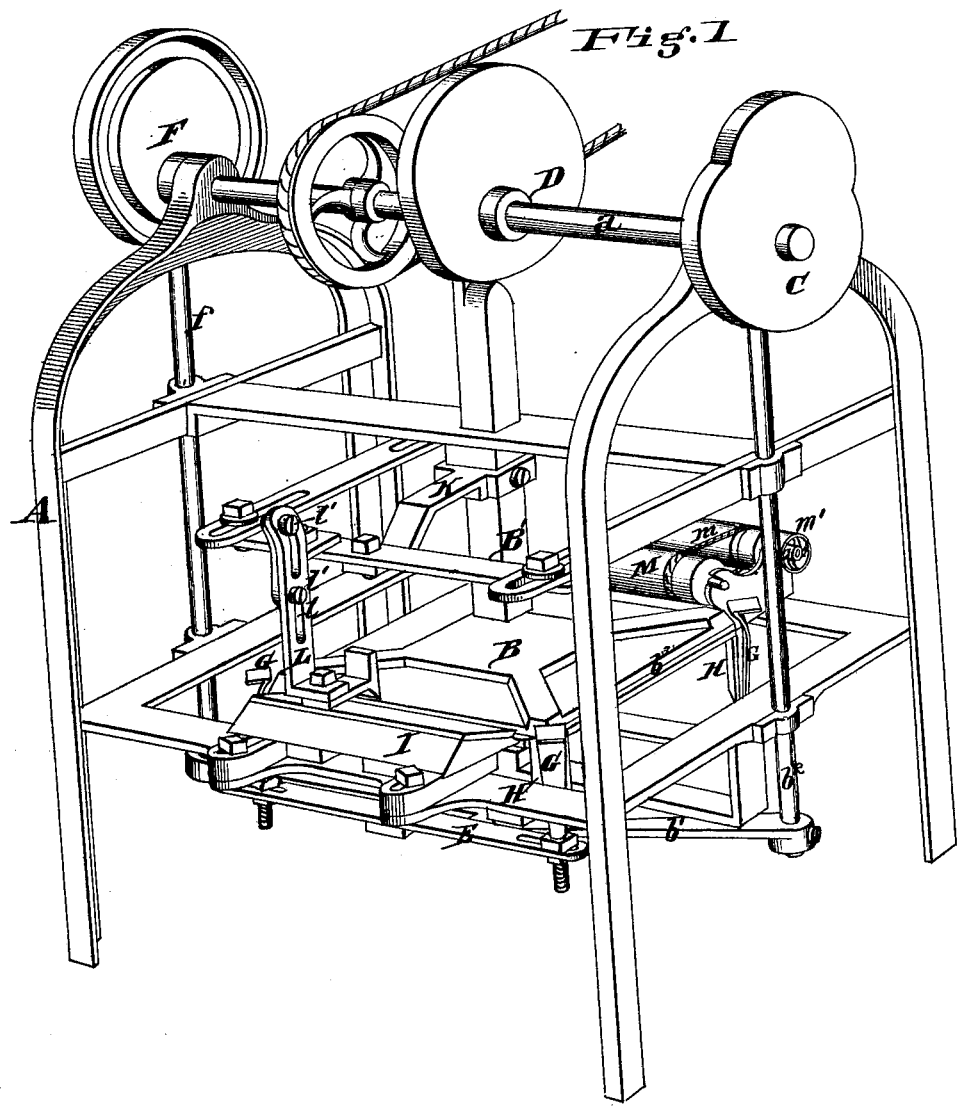

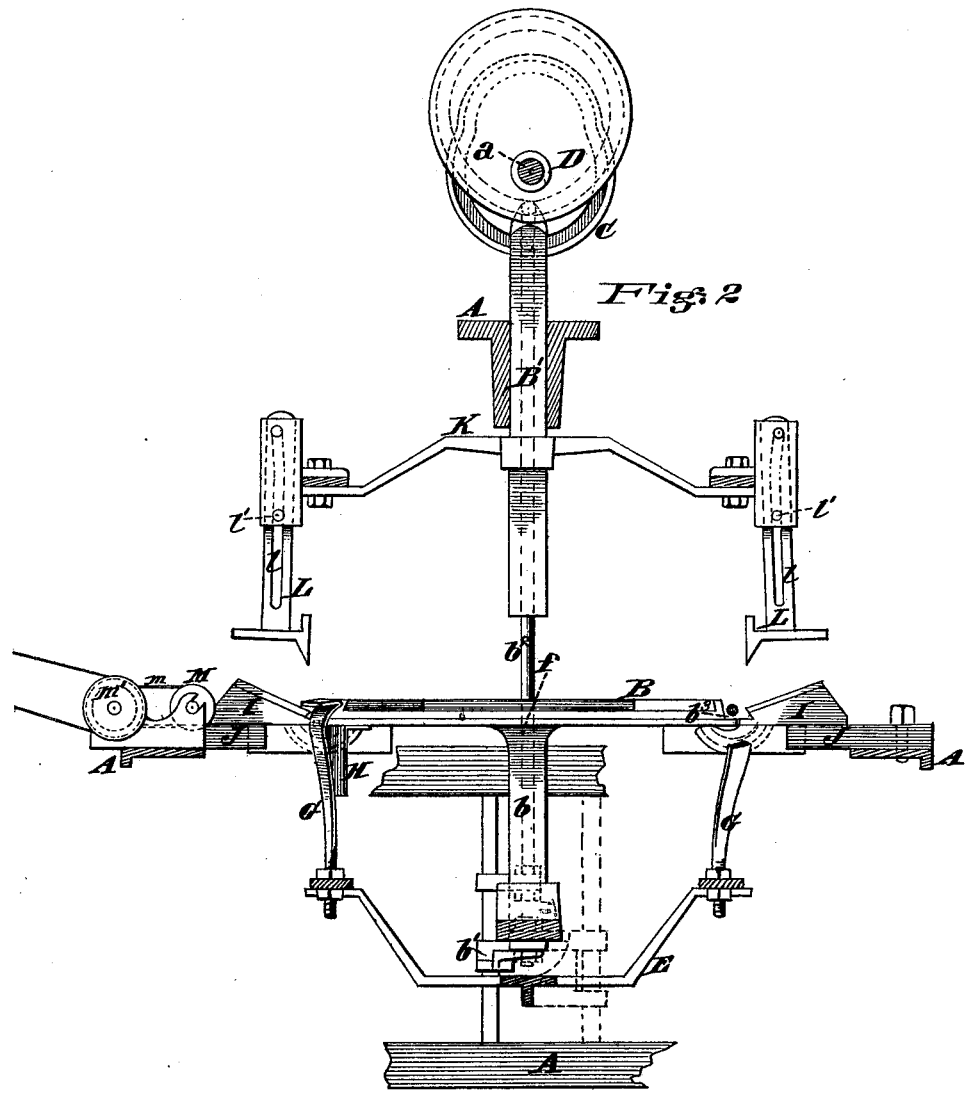

WASHINGTON FOGLESONG, OF DAYTON, OHIO, ASSIGNOR TO THE DRIPPING PAN COMPANY, OF SAME PLACE.

IMPROVEMENT IN PAN-WIRING MACHINES.

Specification forming part of Letters Patent No. 185,513, dated December 19, 1876; application filed July 24, 1876.

*To all whom it may concern:*

Be it known that I, WASHINGTON FOGLESONG, of Dayton, Montgomery county, State of Ohio, have invented an Improvement in Sheet-Metal-Pan-Wiring Machines, of which the following is a specification:

My invention relates to improvements in pan-wiring machines patented by me March 18, 1873; and my invention has for its object the provision of mechanism for forcing the wire laterally into the exact position required to receive the pressure of the blades of the machine, which are shown in my former patent, it having been found by me that the action of the blades referred to was not always reliable in pressing the wire, which had a flexible character, not adapted to occupy exact positions; and my invention has further for its object the provision of mechanism for removing the pan from the dies and from the machine; and my invention consists, in the first part, in connection with the pressure-blade referred to, and shown in my former patent, for pressing the wire down, of certain peculiar devices for locating and keeping the wire in position, more fully explained hereafter.

My invention consists, in the second part, in connection with the clamping-heads for holding the pan while being wired, of a series of spring-lifters secured to operate simultaneously with the traveling head and along surfaces leading to the corners of the stationary head, to act to remove the pan from the clamps and hold it in position for removal from the machine, the whole more fully described hereafter.

My invention consists, in the third part, in connection with the machine, of certain devices for removing the pans from the machine, more fully specified hereafter.

Figure 1 is a perspective view of a sheet-metal-pan-wiring machine embodying my invention. Fig. 2 is a sectional elevation and diagram of the same.

A is the frame of the machine, provided with the cam counter-shaft $a$. B is the stationary clamping-head, having plunger-support $b$. B' is the traveling clamping-head, moving in bearings in the frame, which head may have an extended flat surface, or merely the end of the plunger, to press the pan to be wired against the clamping-head B. The clamping-head B remains stationary during the action of clamping the pan; but after that, through the action of suitable cam C on shaft $a$, it travels downward in the act of assisting to wire the pan, and as the pan must still be held rigid during this motion of head B, the cam D, which operates the head B', must be of such formation that it will cause the said head B' to concertedly follow the movement of the head B as it rises and falls, and, when the operation of wiring the pan is complete, to leave the head B and relieve the pan from confinement. The head B' is connected directly to cam D by the usual roller-pin connection, and the head B gravitates against a slide, $b^1$, operated by cam C through rod $b^2$. The head B' has a reciprocating motion during one revolution of the cam-shaft, while, owing to the configuration of the cam C, it stops for a short time at the upper end of the stroke, to give time for the removal of the pan, and its reciprocal movement is equal to head B, and enough more to sever contact between the two heads. E is a traveling frame, operated by cam F through rod $f$. The cam F is coextensive in size and relative position upon the cam-shaft $a$, with the cam D, and consequently the frame E moves through equal distance of travel simultaneously with the head B'. The frame E is provided with spring-rods G, in such position and number upon the frame that one of them shall be in line with each of the corners of the head B. These rods have a slight tendency to strike the under side of head B inside the corners, and this tendency is desired to cause the rods to bear firmly against guide-plates H, leading to and secured to the corners of the head, so that they may pass close to the corners of said head and come in contact with anything extending beyond the corners, and act to remove it upward from the head. The tops of these rods G are bent over and flat, to furnish a broad supporting-surface, and they are secured adjustably to the frame E by suitable set-screw connections. The head B is formed the shape of the pan, and is provided to support it in an inverted position during wiring. It is formed with an offset, $b^3$, to support the turned-out edge of the pan when forced into it by the pressure-blades, which also force the wire on top of it, and which blades, as aforesaid, are described and claimed in my former Letters Patent. I designates the tilting blocks for folding the edge of the pan around the wire. These blocks are secured to revolve around centers by means of segmental rib-and-groove connections with the head B, as shown by dotted lines, Fig. 2, and these blocks assist to fold the edge of the pan around the wire by coming in contact with the projection J as the head B moves downward, and tilting over onto the wire. Secured upon the plunger-head B' is a frame, K. To this frame are secured fingers L. These fingers are provided with slots $l$, by which they connect to and are supported by the pins $l'$. The slots $l$ are angling in direction for the purpose following. The fingers L are of such length that they extend down beyond the limit of the head B', and, when in operation, strike against the blocks I and remain stationary, while the frame with head B still continues to move until one of the pins $l'$ reaches the points where the slots $l$ change direction, when immediately they move inward and press the rim-wire to a position upon the edge of the pan, and there retain it, so that the pressure-blades specified in my former patent may descend squarely upon it and force it, with the pan-edge, down upon the offset $b^3$, in position to be further acted upon by blocks I as the head B moves downward in completing the wiring of the pan. By the action of these fingers it will be seen that the wire in every case must, perforce, take a position directly in the path of the descending pressure-blades, and the possibility of the blades missing the wire, and the crimping of the pan-edge to the exclusion of the wire, will be precluded. On the frame of the machine is secured a carrier device, composed of rollers M and belt $m$, suitably set in motion by belt to driving-pulley $m'$. Upon this device, which may be of any length and contain any number of rollers M, the pans may be placed and conveyed to any desired spot.

I claim—

1. In a sheet-metal-pan-wiring machine, the wire locating and retaining fingers L $l$, secured upon pins $l'$, to operate substantially as and for the purpose specified.

2. In a sheet-metal-pan-wiring machine having clamping-heads B B', the spring-lifters G, operating along guide-plates H, substantially as and for the purpose specified.

3. In a sheet-metal-pan-wiring machine, the carrying and conveying device M $m$ $m'$, connected to operate substantially as and for the purpose specified.

In testimony of which invention I hereunto set my hand.

WASHINGTON FOGLESONG.

Witnesses:
J. L. WARTMANN,
JOHN E. JONES.